(12) United States Patent
Heo et al.

(10) Patent No.: US 9,973,986 B2
(45) Date of Patent: May 15, 2018

(54) SYSTEMS AND METHODS FOR MOBILITY OPTIMIZATION IN A HETEROGENEOUS NETWORK

(71) Applicant: Intel IP Corporation, Santa Clara, CA (US)

(72) Inventors: Youn Hyoung Youn Heo, Seoul (KR); Candy Yiu, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 434 days.

(21) Appl. No.: 14/127,923

(22) PCT Filed: Sep. 26, 2013

(86) PCT No.: PCT/US2013/061962
§ 371 (c)(1),
(2) Date: Dec. 19, 2013

(87) PCT Pub. No.: WO2014/113085
PCT Pub. Date: Jul. 24, 2014

(65) Prior Publication Data
US 2014/0198767 A1 Jul. 17, 2014

Related U.S. Application Data

(60) Provisional application No. 61/753,914, filed on Jan. 17, 2013.

(51) Int. Cl.
*H04W 36/02* (2009.01)
*H04W 36/04* (2009.01)
(Continued)

(52) U.S. Cl.
CPC ........ *H04W 36/023* (2013.01); *H04B 7/0417* (2013.01); *H04W 72/00* (2013.01);
(Continued)

(58) Field of Classification Search
None
See application file for complete search history.

(56) References Cited

U.S. PATENT DOCUMENTS 5,548,806 A * 8/1996 Yamaguchi ........... H04W 36/04
455/441
6,804,221 B1 * 10/2004 Magret ................. H04W 8/087
370/312
(Continued)

FOREIGN PATENT DOCUMENTS

EP        2205021 A1 *  7/2010  ........... H04W 36/02
WO    2007144762 A2    12/2007
(Continued)

OTHER PUBLICATIONS

Kanter, et al., "Distributed Context Support for Ubiquitous Mobile Awareness Services", ChinaCOM 2009, 6 pages.
(Continued)

*Primary Examiner* — Noel Beharry
*Assistant Examiner* — Rodrick Mak
(74) *Attorney, Agent, or Firm* — Stoel Rives LLP

(57) ABSTRACT

Methods, systems, and devices for mobility optimization in a heterogeneous network are disclosed herein. A base station includes an anchor module, a context information module, and a transmission point module. The anchor module configures the base station as a virtual anchor cell for a plurality of small cells. The context information module is configured to maintain context information for user equipment (UE). The context information for the UE is maintained by the context information module while any small cell of the plurality of small cells is configured as a TP for the UE. The transmission point (TP) change module is configured to send at least a portion of the context information to a small cell configured as the TP for the UE.

21 Claims, 9 Drawing Sheets

(51) Int. Cl.
*H04B 7/0417* (2017.01)
*H04W 72/00* (2009.01)
*H04W 76/02* (2009.01)

(52) U.S. Cl.
CPC .......... *H04W 76/023* (2013.01); *H04W 36/04* (2013.01); *Y02D 70/12* (2018.01)

(56) References Cited

U.S. PATENT DOCUMENTS

| | | | |
|---|---|---|---|
| 7,233,583 B2 | 6/2007 | Asthana et al. | |
| 7,339,928 B2* | 3/2008 | Choyi | H04L 45/00 370/390 |
| 7,848,513 B2* | 12/2010 | Yun | H04W 36/0038 380/27 |
| 2007/0025294 A1* | 2/2007 | Kim | H04W 36/005 370/331 |
| 2007/0291695 A1 | 12/2007 | Sammour et al. | |
| 2009/0254972 A1* | 10/2009 | Huang | G06F 21/6209 726/1 |
| 2009/0316655 A1* | 12/2009 | Prakash | H04W 36/0088 370/331 |
| 2010/0008235 A1* | 1/2010 | Tinnakornsrisuphap | H04L 29/12264 370/241 |
| 2010/0105404 A1* | 4/2010 | Palanki | H04L 1/0025 455/450 |
| 2011/0092213 A1* | 4/2011 | Forsberg | H04L 63/06 455/436 |
| 2011/0230195 A1* | 9/2011 | Li | H04W 4/02 455/445 |
| 2011/0294508 A1* | 12/2011 | Min | H04W 76/028 455/436 |
| 2012/0021725 A1* | 1/2012 | Rune | H04W 48/16 455/411 |
| 2012/0322452 A1* | 12/2012 | Samuel | H04W 36/0083 455/437 |
| 2013/0028097 A1* | 1/2013 | Barrett | H04W 60/00 370/241 |
| 2013/0064226 A1* | 3/2013 | Dinan | H04W 36/30 370/332 |
| 2013/0301439 A1* | 11/2013 | Heo | H04W 76/048 370/252 |
| 2014/0226570 A1* | 8/2014 | Comeau | H04W 72/042 370/329 |
| 2014/0302850 A1* | 10/2014 | Young | H04W 88/04 455/436 |
| 2015/0017976 A1* | 1/2015 | Liu | H04W 36/0033 455/423 |

FOREIGN PATENT DOCUMENTS

| | | | | |
|---|---|---|---|---|
| WO | WO 2008098194 A2 * | 8/2008 | ........ | H04W 36/0033 |
| WO | WO 2012116642 A1 * | 9/2012 | ............ | H04W 36/12 |
| WO | 2013166330 A1 | 11/2013 | | |

OTHER PUBLICATIONS

International Search Report and Written Opinion received for PCT Patent Application No. PCT/US2013/061962, dated Dec. 30, 2013, 10 pages.

* cited by examiner

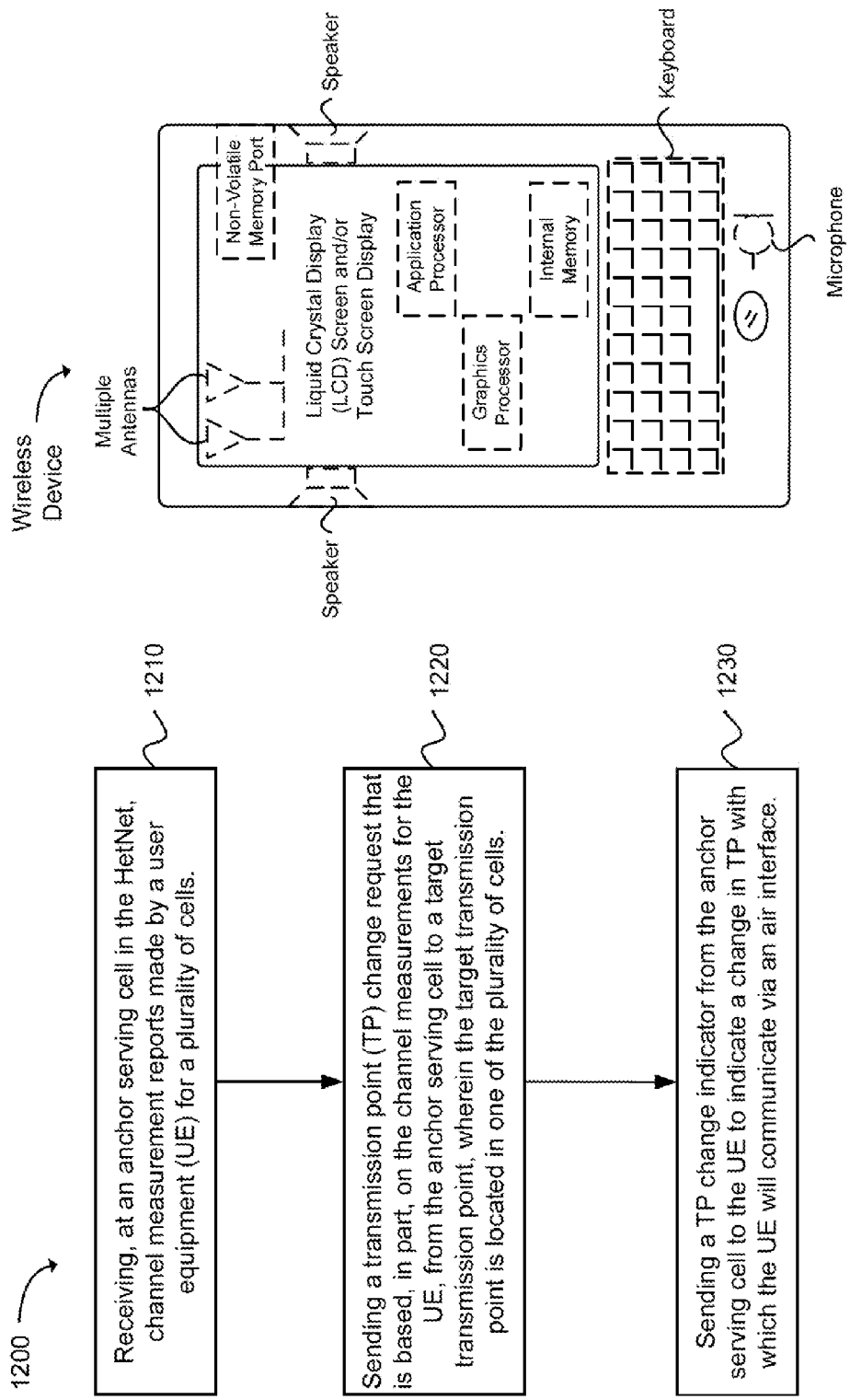

SYSTEMS AND METHODS FOR MOBILITY OPTIMIZATION IN A HETEROGENEOUS NETWORK

RELATED APPLICATION

This application claims the benefit under 35 U.S.C. § 119(e) of U.S. Provisional Application No. 61/753,914, filed Jan. 17, 2013 which is incorporated by reference herein in its entirety.

TECHNICAL FIELD

The present disclosure relates to mobility optimization in wireless networks and more particularly relates to mobility optimization in a heterogeneous network.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 12 depicts a flow chart of a method for performing a handover in a heterogeneous wireless network (HetNet) in accordance with an example; and FIG. 13 illustrates a diagram of a wireless device (e.g., UE) in accordance with an example.

Figure 1:
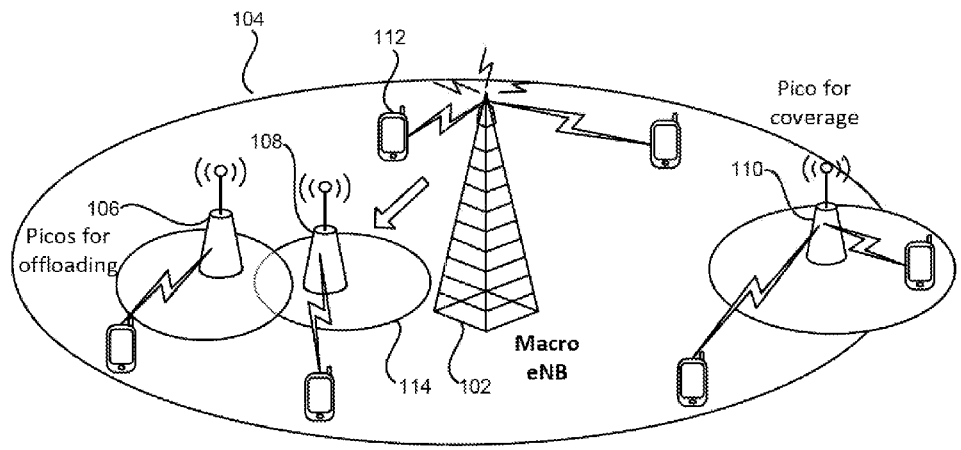
FIG. 1 illustrates a block diagram of a heterogeneous wireless network.

Reference will now be made to the exemplary embodiments illustrated, and specific language will be used herein to describe the same. It will nevertheless be understood that no limitation of the scope of the invention is thereby intended.

DETAILED DESCRIPTION OF PREFERRED EMBODIMENTS

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) Rel. 8, 9 and 10, the Institute of Electrical and Electronics Engineers (TELE) 802.16 standard (e.g., 802.16e, 802.16m), which is commonly known to industry groups as WiMAX (Worldwide interoperability for Microwave Access), and the IEEE 802.11-2012 standard, which is commonly known to industry groups as Win.

In a 3GPP radio access network (RAN) LTE system, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission may be a communication from the node (e.g., eNB) to the wireless device (e.g., UE), and the uplink (UL) transmission may be a communication from the wireless device to the node.

In homogeneous networks, the node, also called a macro node, may provide basic wireless coverage to wireless devices in a cell. The cell may be the area in which the wireless devices are operable to communicate with the macro node. Heterogeneous networks (HetNets) may be used to handle the increased traffic loads on the macro nodes due to increased usage and functionality of wireless devices. HetNets may include a layer of planned high power macro nodes (macro-eNBs or macro cells) overlaid with layers of lower power nodes (small cells, small-eNBs, micro-eNBs, pica-eNBs, femto-eNBs, or home eNBs [HeNBs]) that may be deployed in a less well planned or even entirely uncoordinated manner within the coverage area (cell) of a macro node. The lower power nodes (LPNs) may generally be referred to as "low power nodes," small nodes, or small cells.

The macro node may be used for basic coverage. The low power nodes may be used to fill coverage holes within a macro node's geographic coverage area (i.e., cell) and at the boundaries between the macro nodes' coverage areas. Low power nodes may also be used to improve capacity in high use areas and improve indoor coverage where building structures impede signal transmission.

HetNets may use time-division duplexing (TDD) or frequency-division duplexing (FDD) for DL or UL transmissions, TDD is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference fix each other. TDM is a type of digital multiplexing in which two or more bit streams or signals, such as a downlink or uplink, are transferred apparently simultaneously as subchannels in one communication channel, but are physically transmitted on different resources. In FDD, an uplink transmission and a downlink transmission may operate using different frequency carriers. In FDD, interference may be avoided because the downlink signals use a different frequency carrier from the uplink signals.

As used herein, the term "substantially" refers to the complete or nearly complete extent or degree of an action, characteristic, property, state, structure, item, or result. For example, an object that is "substantially" enclosed would be either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the terms "node" and "cell" are both intended to be synonymous and refer to a wireless transmission point operable to communicate with multiple user equipment, such as an eNB, a low power node, or other base station.

A potentially large number of low power nodes, such as pica nodes, may exist within the geographic region covered by a macro eNB. For example, FIG. 1 illustrates a macro eNB 102 that provides coverage area 104. Within this coverage area 104 are two small cells 106, 108 which may be used to improve capacity in high use areas by allowing the macro eNB to offload to the small cells 106, 108. Another small cell 110 is illustrated as existing on the edge of the coverage area 104. The small cell 110 may be used to fill coverage holes within the macro node's coverage area 104 and at the boundaries between the macro nodes' coverage area, as shown in FIG. 1.

While three small cells 106, 108, 110 are illustrated within the coverage area of the macro node 102, a macro node's coverage area may include hundreds or even thousands of small nodes. For example, small nodes configured as HeNBs may be located in hundreds or thousands of homes that are within the coverage area of a single macro node. Similarly, within one RAN there may be a mixture of sparse and dense small cell deployments.

Frequent handover may occur if a user equipment (UE) is moving around relative to a large number of low power nodes located within the macro node's coverage area. Frequent handover is typically not desirable since the handover procedure, as outlined in the 3GPP LTE specifications (including Rel. 8, 9 and 10), entails a fairly large number of overhead messages, such as radio resource control (RRC) signaling messages that are communicated between the UE and the wireless network. In addition, handover may also entail additional overhead, including physical layer reconfiguration and uplink synchronization with random access when a UE enters the coverage area of a new node, such as an LPN. Thus, significant control signaling overhead may be imposed on both a RAN (such as an eNB or other node) and core network infrastructure (such as an MME or S-GW within an EPC). Reducing handover and/or handover signaling in HetNets may result in significant overhead savings for the core network or the RAN.

Figure 2:
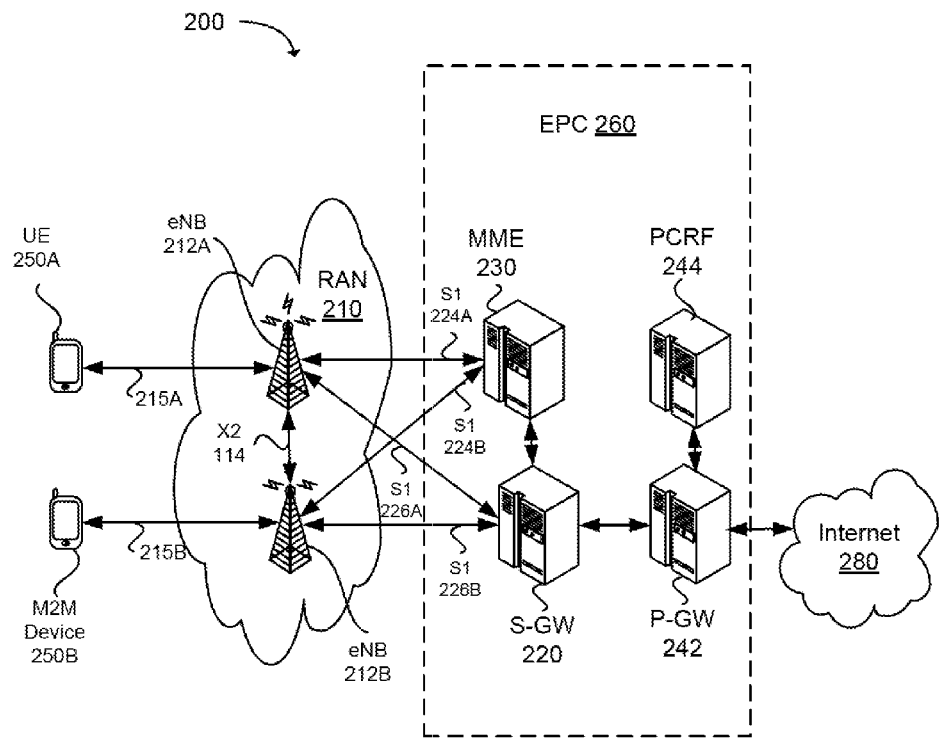
FIG. 2 illustrates a block diagram of third generation partnership project (3GPP) wireless network.

A brief review of a wireless network is provided for clarity. FIG. 2 illustrates an example of a 3GPP LTE radio access network (RAN) system. The system operates based on the 3GPP LTE specification, such as releases 8, 9, 10, and 11. The wireless network 200 illustrated in FIG. 2 is comprised of a RAN 210 and an evolved packet core (EPC) 260. For 3GPP LTE, the RAN 210 illustrated in FIG. 2 may include transmission nodes such as the evolved universal terrestrial radio access (E-UTRAN or eUTRAN) or UTRAN modules, represented as the eNBs 212A and 212B. The eNBs may include both a macro node and a plurality of low power nodes, as previously discussed.

The RAN 210 may be in communication with an evolved packet core (EPC) 260. The EPC may include a serving gateway (S-GW) 220 and a mobility management entity (MME) 230. The EPC 260 may also include a packet data network (PDN) gateway (P-GW) 242 to couple the S-GW to a PDN, such as the Internet 280, an intra-net, or other similar network. The S-GW 220 may provide interact network access and standard network access for the mobile devices associated with the RAN 210. The S-GW 220 and MME 230 may be in direct communication with each other via cabling, wire, optical fiber, and/or transmission hardware, such as a router or repeater.

The eNBs 212A-B may be connected to one or more UEs, such as UEs 250A-B, via an LTE radio link 215A-B, respectively. A backhaul link 114, such as an X2 link, may be used to connect the eNBs 212A-B. The X2 link is typically formed over a broadband wired or optical connection between the eNBs 212A-B. Connections between the eNBs 212A-B, the S-GW 220, and the MME 230 may be made via S1 type connections 224A-B, and 226A-B. The S1 interface is described in 3GPP Technical Specification (TS) 36.410 versions 8 (Dec. 11, 2008), 9 (Dec. 10, 2009) and 10 (Mar. 23, 2011), which are available to the public.

The EPC 260 may also include a policy and charging rules function (PCRF) node 244 that may be used to determine, in near real time, policy rules in the wireless network. The PCRF node 24 may access subscriber databases and other specialized functions, such as charging systems, as may be appreciated.

In accordance with one embodiment of the present invention, in order to avoid frequent handover procedures in a HetNet deployment scenario, as illustrated in FIG. 1, a new handover procedure is disclosed. In the new handover procedure, a UE may maintain a connection with a macro eNB while moving between LPNs within the macro node's coverage area. Each LPN may be referred to as a transmission point/reception point. As a UE moves from one transmission point/reception point (i.e., an eNB such as an LPN) to another transmission point/reception point, the UE may maintain radio resources that are configured at the HE side with the macro node. This allows the UE to move from macro cell to small cell or vice versa without tearing down and rebuilding radio resources, such as a radio resource control (RRC) connection with the macro node.

In one embodiment, the macro node 102 and small cell 106, 108 may be within wireless communication range, such as a small cell used for offloading. Alternatively, the small cell 110 may be outside the range of the macro node, such as a small cell used to provide additional coverage. Whether the small cell is inside or outside the wireless communication range of the macro node, the small cell and macro node may be connected via a wired or optical connection to form an X2 interface. In addition, when the small cell is within the wireless communication range of the macro node, the small cell and macro node may communicate via an air interface, as may be appreciated.

When a HE moves from the coverage area 104 of a macro node 102 into the coverage area 114 of a small cell 108, the HE may not be able to receive a downlink signal from the macro node due to interference from a downlink signal from the small cell. In order for a HE to maintain a connection with a wireless network, the HE is typically configured to be handed over from the macro node to the small cell. This process is referred to as handover.

During handover, most of the physical channels are reconfigured because physical channels are typically defined relative to the node to which they are connected (i.e., macro node or LPN). Each node may also be referred to as a cell. The relationship of the physical channels with respect to the cell is referred to as being defined in a cell specific manner, based on a physical cell ID of the cell.

For example, the scrambling sequence for a HE may be initialized based on physical cell ID. When the HE communicates with a macro cell, the physical channels are scrambled by the cell ID of the macro cell. When the UE communicates with a small cell, the physical channels are configured to be scrambled by a cell ID of the small cell. To overcome this limitation, cell specific parameters may be replaced with UE specific parameters. UE specific parameters may include a channel state information reference signal (CSI-RS) and a demodulation reference signal (DMRS).

For instance, the scrambling sequence of a CSI-RS or a DMRS of a Physical Downlink Shared Channel (PDSCH) or an Enhanced Physical Downlink Control Channel (E-PDCCH) may be initialized with an RRC configured parameter instead of a cell ID of a specific node or cell. To derive a base sequence and cyclic shift hopping initialization for a Physical Uplink Shared Channel (PUSCH), a Physical Uplink Control Channel (PUCCH) or Sounding Reference Signal (SRS), an RRC configured UE specific parameter may be used instead of a physical cell ID of a specific node. For example, a virtual cell identity may be configured for the PUSCH, PUCCH or SRS. The same virtual cell identity may be applied for all uplink channels or a different virtual cell identity may be applied for each channel. Furthermore, for the cyclic shift hopping initialization, a dedicated cyclic shift hopping identity may be signaled and may be used instead of a physical cell identity.

Once all physical channels are not tied to a cell specific parameter, the UE does not need to perform radio resource reconfiguration when a handover occurs, even when the transmission point has changed from one cell to another cell. The UE may continue to use the radio resource configured by the macro cell. In other words, the UE may continue to transmit and receive signals via downlink and uplink channels configured by the macro cell.

If a cell-specific reference signal (CRS) to resource element (RE) mapping is different between a macro cell and a small cell, the simple indication of a transmission point (TP) change may be used to inform the UP of the change. A transmission point is a cell configured to transmit a signal. Similarly, a reception point (RP) is a cell configured to receive a signal. The TP and RP are typically in the same cell. However, it is possible for the TP and RP to be located in different cells. In this case, the UE may need to know that a change in transmission point has occurred to apply a rate matching of PDSCH data around CRS resource elements (REs). Otherwise, a change in TP may be transparent to the UE.

For example, from the UE's perspective, the current serving macro node with which the UE is in communication, referred to herein as the anchor serving cell, may continue to be the serving cell regardless of a change in TP. In one embodiment, the anchor serving cell of the UE does not change even when the UE moves out of the coverage area of the anchor serving cell.

Figure 3:
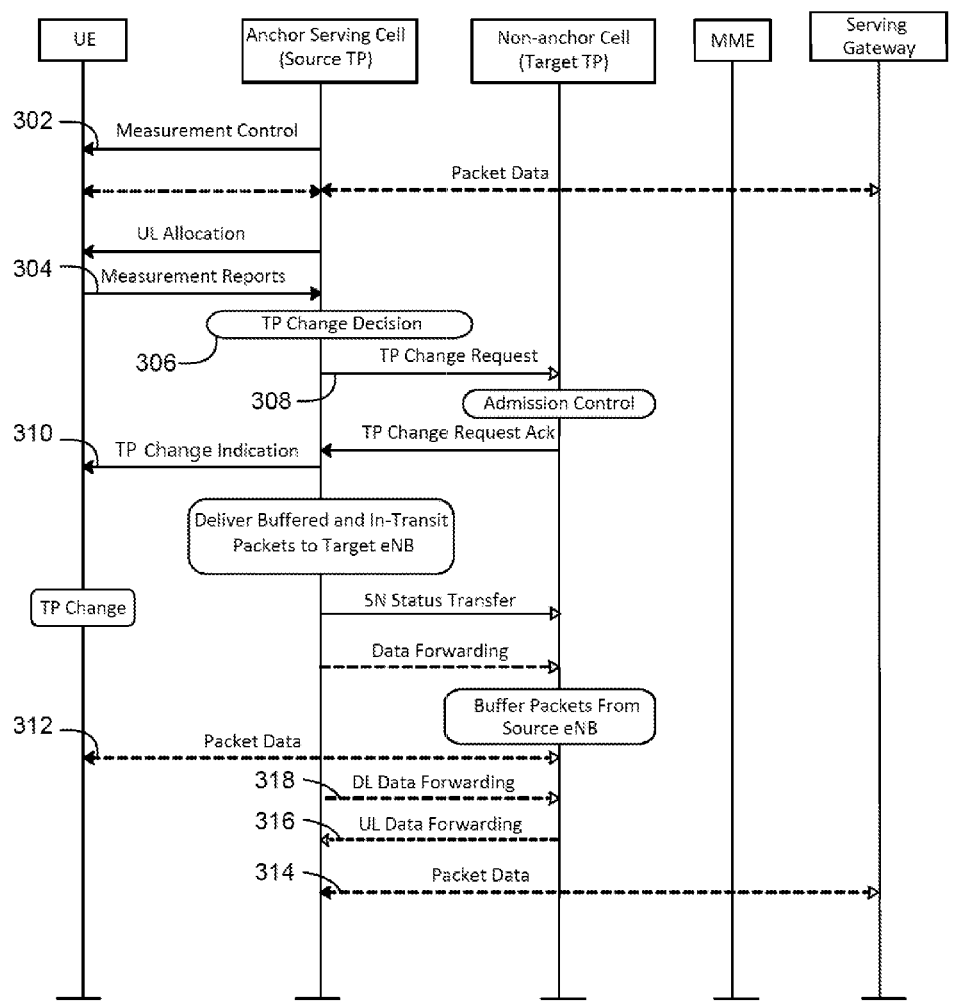
FIG. 3 illustrates a flow diagram of a change in transmission point for a user equipment (UE) in accordance with an example.

FIG. 3 provides one example illustration of information communicated within a HetNet to implement a TP change from an anchor serving cell to a non-anchor cell.

In accordance with one embodiment, an anchor serving cell, such as a macro cell, may be configured to determine whether a TP change is needed based on one or a combination of measurement reporting. The anchor serving cell may indicate to the UE the type of measurements desired and send a measurement control message 302 to a UE. In this period, the UE may still communicate packet data to the anchor serving cell. The anchor serving cell may then forward the packet data to the serving gateway, as illustrated in FIG. 3.

One measurement may include a CRS based Radio Resource Management (RRM) measurement, which may be performed as described in the 3GPP UE Rel. 8 specification describing RRM measurements. The anchor serving cell may configure the UE to measure neighboring cells, including a target cell. A target cell, as used herein, is a macro node or LPN associated with a coverage area in which the UE is located in or is moving towards. As the UE moves towards the target cell, power based measurements will increase, while power based measurements made by the UE with respect to the anchor serving cell will decrease, as occurs in a typical handover.

A CSI-RS based RRM measurement may also be performed. For example, the UE may measure CSI-RS transmitted from each TP. In this case, a new set of cells may be defined in order to let the UE know which CSI-RS or the CSI-RS of which neighboring cell should be measured. Another measurement that may be performed includes CSI feedback in a physical uplink control channel (PUCCH). The source cell, such as the anchor serving cell, may configure the UE to send CSI feedback of a set of CSI-RS ports that are transmitted from the target cell or a set of neighbor cells. The CSI feedback may be UE specific instead of cell specific.

The UE may then send one or more measurement reports 304 to the anchor serving cell after the UE is scheduled with a UL allocation. The report of the measurements may be communicated at a predetermined frequency, communicated when a trigger is received from the serving cell, or communicated when a reporting condition is met.

As the UE enters the coverage area of a non-anchor cell, referred to as a target TP, a TP change decision may be implemented by the anchor serving cell. The anchor serving cell may transmit a TP change request 308 to the target TP. In this request, the anchor serving cell passes selected information to prepare for a TP change at the target TP. The selected information may include a UE specific identity used for physical channels. If the UE radio resource information for physical channels is already shared by possible cells for a TP change only the TP change indication may be transmitted to the target TP. The anchor serving cell may determine the possible cells of the TP change when it determines possible cells for CSI-RS RRM measurement. A TP change request acknowledgement may then be sent from the target TP to the anchor serving cell.

After a TP change request acknowledgement message is received by the anchor serving cell, a TP change indication message 310 may be sent from the anchor serving cell to the UE. In one embodiment, the TP change indication message may be communicated to the UE via at least one of Downlink Control Information (DCI), Medium Access Control (MAC), Control Element (CE) or RRC signaling.

When DCI is used to communicate the TP change indication message from the anchor serving cell to the UE, the presence of a TP indicator may be configured by RRC signaling to include the TP indicator only when it is required. In this case, either the anchor serving cell (i.e., source TP) or target TP may send a TP or reception point (RP) change indicator depending on when the TP change is applied. For example, if the TP is changed from the subframe when the indicator is received, the TP change indicator is transmitted from the target TP. If the TP is changed after the TP change indicator is received, the TP change indicator could be transmitted from the source TP.

When RRC signaling is used to communicate the TP change indication message from the anchor serving cell to the UE, the TP change indication message may comprise an RRC connection reconfiguration message with a TP change indicator, which may be signaled using RRC signaling. Since the exact activation time of reconfiguration with RRC signaling is not defined, the timing of changing of a TP may be different depending on a UE RRC processing time. In one embodiment, the UE RRC processing time may be taken into account when determining when to schedule a packet data transmission for the RRC connection reconfiguration message with the TP change indicator. The eNB may send the TP change indication message X subframes before TP is changed, where X subframes is defined considering the UE RRC processing time and other factors, e.g., HARQ processing time.

When a medium access control (MAC) control element (CE) is used to communicate the TP change indication message from the anchor serving cell to the UE, a TP change indicator may be included in a MAC CE. In one embodiment, a new MAC CE may be defined with a new Logical Channel Identity (LCID). Alternatively, an activation/deactivation MAC CE may be reused if it is not used for carrier aggregation.

After the TP has been changed, packet data transmission 312 and reception 314 may occur between the UE and the target TP. In uplink communication, the target TP may forward 316 the received packet to the anchor serving cell, which delivers the received packet to the serving gateway (S-GW). In downlink communication, the anchor serving cell delivers buffered packets to the target TP 318 and the target TP buffers packets from the anchor serving cell until the UE is prepared to receive the signal from the target TP. If the UE is ready to receive the signal from the target TP, the target TP transmits it to the UE via an air interface.

After the TP has been changed, the UE may need to perform updates with respect to PDSCH decoding, uplink synchronization, radio link monitoring and uplink power control, downlink synchronization, and the MIB/SIB. The updates that may need to be performed will be discussed more fully in the proceeding paragraphs.

The UE typically performs PDSCH decoding based on the target TP information after the TP has been changed. For example, the PDSCH or ePDCCH configuration is the same but CRS resource element (RE) position is changed with a new TP because the CRS is cell specific and the position may be different in each cell. Therefore, REs available for PDSCH REs may be changed based on the CRS RE position of the new TP because the PDSCH or the ePDCCH is transmitted in the remaining REs which are not used for CRS. If the CRS is not transmitted in the serving cell, such as in a new carrier type disclosed in the 3GPP UE Rel-11 specification, this operation is not required.

With regard to uplink synchronization, the receiving point (RP) may be changed along with the TP. If the RP is changed, the UE may be synchronized to the target RP. If the target RP already receives the uplink channels from the UE before the TP change happens then uplink synchronization may not required. For instance, sending a time alignment command from the UE to the new RP may be sufficient to synchronize the UE with the RP for communicating data in the uplink. If the timing in the UL transmission from the UE to the new RP is off by an amount that is greater than the time alignment command may handle then the UE may be configured to send a physical random access channel (PRACH) preamble for uplink synchronization. Until the random access procedure is completed, the UE may suspend the uplink transmission or transmit the uplink based on the timing of the serving cell. Alternatively, the timing advance value may be signaled without sending the PRACH preamble if the anchor serving cell or target RP knows the proper timing advance value. One example scenario for this approach is that the cell size of the target TP is so small that zero timing advance value is required.

If radio link monitoring and uplink power control are based on the CRS of the anchor serving cell, the UE is likely to experience a radio link failure and to use a high transmit power, as specified by the 3GPP UE specification Rel. 10. To avoid this problem, the reference RS for radio link monitoring (RLM) and uplink power control may be changed to the CSI-RS of the target TP. If the UE knows CRS information associated with the target TP, the CRS of the target TP may be used for RLM and uplink power control.

With regard to downlink synchronization, if the UE is located within a target TP's coverage, it may be hard to receive CRS from the anchor serving cell due to interference. One possible problem is that poor CRS signal quality may degrade synchronization performance. When the TP changes, the UE may also change the synchronization reference with CST-RS or CRS of the target TP.

If the RRC layer is still in the anchor serving cell, the UE may still need to receive master information block (MIB) and system information block (SIB) information from the anchor serving cell only. In this case, the UE may receive MIB/SIB updated information with dedicated RRC signaling. In another embodiment, if the RRC layer is moved to a non-anchor cell of a target TP, the UE may receive the MIB/SIB information of the target TP. When the RRC layer is moved to the non-anchor cell of the target TP then the UE may receive the MIB/SIB information of the target TP directly or the target TP may send the MIB/SIB information to the UE by using dedicated RRC signaling.

The anchor serving cell may be configured to typically connect the UE with the best DL and UL cell. In the TP change flow illustrated in FIG. 3, it is assumed that the best downlink cell and the best uplink, cell are located at the same cell. Therefore, the TP and RP may typically be associated with the same cell. However, it is also possible that a TP and an RP are associated with different cells. In this case, the TP and RP changes are triggered to the different non-anchor cells and the UE is signaled with a TP change and an RP change indication separately. The process, however, remains similar to the flow illustrated in FIG. 3 and described in the preceding paragraphs, as may be appreciated.

When a UE moves from a non-anchor cell (source TP) to an anchor serving cell (target TP) to produce a TP change, the process illustrated in FIG. 3, in which the TIE moves from an anchor serving cell to a non-anchor cell, may still be performed. However, when moving from a non-anchor cell to an anchor serving cell, if an RRC layer connection of the UE is still in the anchor serving cell then the measurement control/TP change decision may be made in the anchor serving cell. If the RRC layer connection of the UE is in the non-anchor cell of the source TP, the measurement control/TP change may be performed by the non-anchor cell of the source TP. When a TP change from the non-anchor cell to the anchor serving cell occurs, an existing U-plane and C-plane tunnel may be released after the TP change is completed. This will be discussed more fully in the proceeding paragraphs.

The ability for a UE to move from one TP to another TP while maintaining an RRC connection may be applied when macro cells and small cells are deployed in the same frequency layer or when macro cells low power nodes are deployed in different frequency layers. In the latter case, the TP change indication may be sent by the anchor eNB containing the source TP so that UE knows ahead of time when to switch the radio frequency signal to the frequency of the target TP. An implicit or explicit action time for the switch to the target TP after receiving the TP change indication from the source TP may be used.

Embodiments of this invention may also be applied when carrier aggregation is used. For example, carrier aggregation may be used when a macro cell and a low power node both deploy carriers f1 and f2. The primary serving cell (Pcell) of the UE corresponds to one of the carriers f1 or f2 of the anchor macro eNB. The secondary serving cell (Scell) of the UE corresponds to the other carrier of the anchor macro eNB.

Embodiments of this invention may also be applied when a macro cell and low power node both deploy carriers f1 and f2, while only the low power node deploys carrier f2. In this embodiment, the primary serving cell (Pcell) of the UE corresponds to one of the carriers f1 and f2 of the anchor macro eNB. The secondary serving cell (Scell) of the UE corresponds to the other of the carriers f1 and f2 of the low power node, which may be designated as the TP of the UE.

Figure 4:
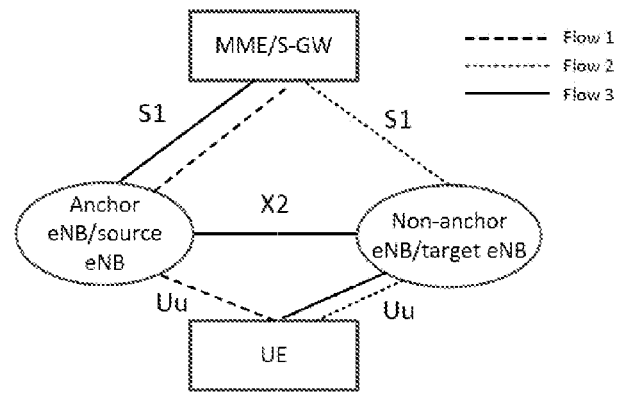
FIG. 4 illustrates a block diagram of an example network architecture to provide a change in transmission point for a UE in accordance with an example.

In a typical 3GPP UE system based on Rel. 8, 9, or 10, when a handover is completed, the S-GW is configured to switch the downlink data paths to the target cell and releases the data path to the serving cell. For example, as shown in FIG. 4, when the UE is located in the anchor/source cell's coverage, the UE is connected to the MME/S-GW through the source cell (marked as How1). If the UE is handed over to the non-anchor/target cell, the UE is connected to the MME/S-GW through the target cell (marked as flow2).

However, in order to perform a TP change without terminating a connection between a UE and the MME/S-GW via the source eNB, a new type of architecture may be used. In accordance with one embodiment of the present invention, a connection of a UE to the anchor/source eNB may be maintained even if the UE enters the coverage of the non-anchor/target eNB, with its associated TP. The UE may be connected to the MME/S-GW through the anchor/source eNB while the air resource connection of the UE is served by the non-anchor/target eNB, as illustrated in FIG. 4 by flow 3.

When an uplink connection is formed, the non-anchor/target eNB forwards the received uplink data to the anchor/source eNB via an X2 interface and the anchor/source eNB delivers the data to the S-GW. For downlink, the anchor/source eNB is configured to deliver the data packet to the target TP via the X2 interface.

When a TP change request is sent from the anchor/source eNB to the non-anchor/target eNB hosting the selected TP. U-plane tunnels may be established between the anchor serving cell and the target TP. One U-plane tunnel for uplink data forwarding and another one for downlink data forwarding for each data radio bearer (DRB). Unlike a typical handover procedure, this U-plane tunnel is used for the target TP to send the uplink data and used for the anchor serving cell to send the downlink data to the target TP after the TP changes. In addition, a C-plane tunnel is also established to forward C-plane data for each signaling radio bearer (SRB) for uplink and for downlink separately between the anchor/source eNB and the non-anchor/target eNB.

Figure 5:
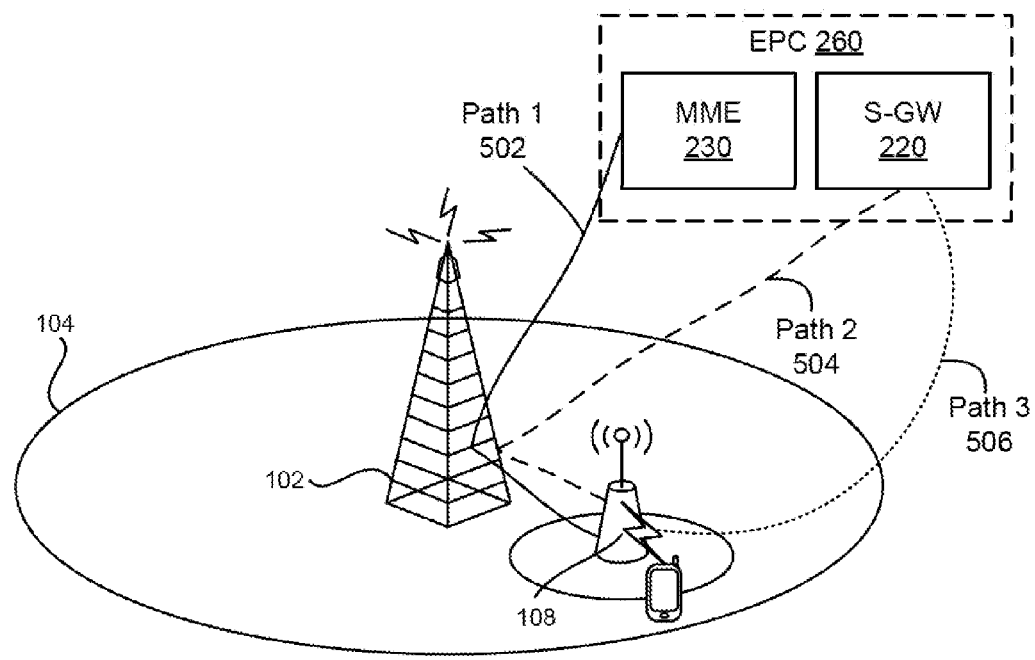
FIG. 5 illustrates a block diagram of communications paths in a heterogeneous network in accordance with an example.

According to one embodiment, control plane and user plane flows may be directed over different paths. FIG. 5 illustrates a macro node 102 with coverage area 104 (or cell) with example paths for control plane and user plane data. Specifically, a first path 502 is shown directed from a serving small cell 108 to the macro node 102 and to the MME 230 in the EPC 260. The first path 502 represents a flow for control data for the UE. According to one embodiment, as a UE changes TP between multiple small cells 108 and/or a macro node 102, the changes and/or movements may be transparent to the MME 230. For example, the MME 230 may not receive messaging updating a location for the UE, a security code, or the like. Thus, messaging to the MME 230, and the associated overhead, may be reduced.

With regard to user plane data, a second path 504 and third path 506 may be available for the UE. In one embodiment, the user plane data may be directed over the second path 804 that is communicated to an S-GW 220 via the macro node 102. For example, the small cell 108 may forward user plane data to the macro node 102 which in turn communicates with the S-GW 220. According to one embodiment, changes between the macro node 102, small cell 108, or other small cells corresponding to the macro node 102, may be transparent to the S-GW 220 because user plane information may be directed between the UE and the S-GW via the macro node 102 before and after a TP change. According to one embodiment, the control plane and user plane data for paths 502 and 504 may be directed over an X2 interface between the macro node 102 and the small cell 108.

In another embodiment, the user plane data may be directed over the third path 506. For example, the user plane data for the UE may be directed from the small cell 108 to the S-GW 220 without passing through the macro node 102. For example, the user plane data may be directed to the S-GW 220 over an S1 interface between the small cell 108 and the S-GW 220. Direction user plane data over an S1 interface to the S-GW may result in the split of the control plane data and the user plane data being transmitted to the EPC 260 using different serving cells. For example, the control plane data may be sent to the macro cell 102 over an X2 interface while user plane data is sent to the S-GW 220 over an S1 interface.

Figure 6:
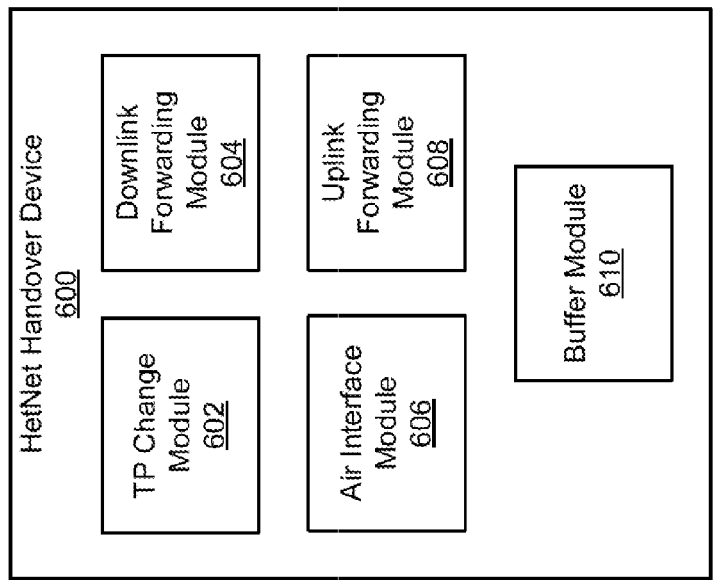
FIG. 6 is a schematic block diagram illustrating a heterogeneous handover device in accordance with an example.

FIG. 6 illustrates a block diagram of a HetNet handover device 600 located in a target transmission point. The target transmission point may reside in the non-anchor eNB/target eNB of FIG. 4. The device 600 may comprise a transmission point (TP) change module 602 configured to receive a TP change request from an anchor serving cell for a UE. The anchor serving cell is synonymous with the anchor eNB/source eNB of FIG. 4.

The device may further comprise a downlink data forwarding module 604 configured to receive downlink information from the anchor serving cell that is sent from a core network. In one embodiment, the core network may comprise an evolved packet core (EPC) that includes an MME and an S-GW.

The device may also include an air interface module 606 configured to send the downlink information to the UE and receive uplink information from the UE via an air interface between the UE and the target cell. The device may also include an uplink forwarding module 608 configured to send the uplink information to the anchor serving cell for communication to the core network to enable the UE to communicate with the core network via the target TP.

The HetNet handover device may further comprise a buffer module 610 configured to buffer packets sent from the anchor serving cell to the target cell. The buffer module is an intermediate phase which typically occurs before the target TP sends downlink data to the UE.

In one embodiment, the downlink data forwarding module 604 is further configured to receive the downlink information from the anchor serving cell via an X2 interface. The downlink information may be sent from at least one of the MME and the S-GW to the anchor serving cell via an S1 connection.

Figure 7:
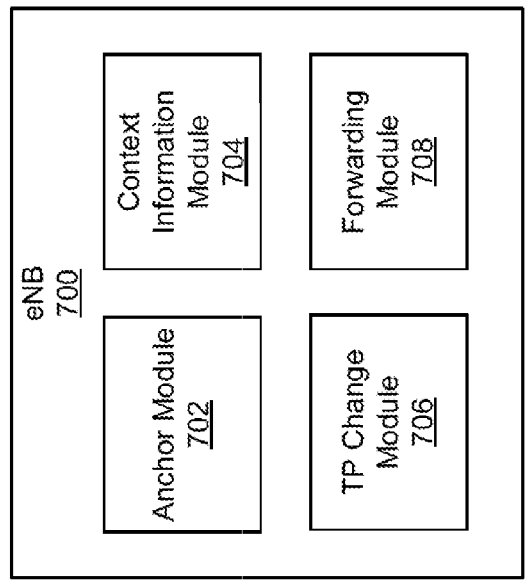
FIG. 7 is a schematic block diagram illustrating an anchor base station in accordance with an example.

FIG. 7 is a block diagram of an eNB 700 which may function as an anchor cell for one or more small cells. The eNB 700 includes an anchor module 702, a context information module 704, a TP change module 706, and a forwarding module 708. The eNB 700 may include the eNB in any of the macro cells of any of FIGS. 1-5.

The anchor module 702 configures the eNB 700 as a virtual anchor cell for a plurality of small cells. According to one embodiment, the plurality of small cells include small cells that are at least partially within or adjacent to a coverage area of the eNB 700. In one embodiment, the plurality of small cells include small cells which have an X2 connection with the eNB 700. In at least one embodiment, the anchor module 702 configures the eNB 700 as an anchor cell for one or more small cells outside of the coverage area of the eNB 700.

The context information module 704 is configured to maintain context information for UEs connected to the eNB 700 and for UEs connected to small cells corresponding to the eNB 700. According to one embodiment, the context information module 704 stores context information for UEs which have a TP that have the eNB 700 as an anchor cell. For example, even though the eNB 700 is not a current TP for the LE, the context information module 704 may store the context information such that the eNB 700 does not need to acquire the context information in the event the UE is handed over to the eNB 700 or to a TP corresponding to the eNB 700.

In one embodiment, the context information module 704 provides UE context information to a small cell in response to the small cell being configured as TP for the UE. For example, if the UE is handed over from the eNB 700 or a corresponding small cell, the context information module 704 may provide the context information to the new TP. In one embodiment, if the UE is handed off to the eNB 700, the source TP does not need to send the context information as this is already stored by the eNB 700. Similarly, even if a source TP hands the UE over to a target TP that is not the eNB 700, the source TP may not need to send the context information as this may be done by the context information module 704 of the eNB 700.

The context information includes information regarding IP bearer services, network internal routing information, and other information regarding a communication and/or connection context of the UE. In one embodiment, the TIE context information may include one or more of X2 signaling context reference at source eNB, UE S1 EPC signaling context reference, target cell ID, security information (such as KeNB* for deriving a security key), RRC context including the cell-specific radio network temporary identifier (C-RNTI) of the UE in the source eNB, access stratum (AS)-configuration, and E-UTRAN radio access bearer (E-RAB) context and physical layer identification (ID) of the source cell with a short message authentication code integrity MAC-I for possible radio link failure (RLF) recovery. According to one embodiment, the context information module 704 stores and/or maintains the context information such that, when the TIE moves back to the macro cell (eNB 700), the small cell does not need to send the UE context information back to the macro cell.

In one embodiment, the context information maintained by the context information module 704 includes security information. This security key may include a value for KeNB* for deriving a security key or the security key value (such as KeNB) itself. The context information module 704 may communicate the security key to a small cell that is currently configured as TP for the UE. In one embodiment, the context information module 704 communicates a security key that is the same as the security key for the anchor cell (eNB 700). Using the same security key may reduce signaling to the core network because the security key stored by the MME or S-GW for the UE may not need to be changed. In another embodiment, the context information module 704 communicates a different security key to the TP and also updates the security key with network infrastructure in the core network (e.g., MME).

The context information maintained by the context information module 704 may include location information. According to one embodiment the location information may include location information that indicates a same location for any small cell that has the eNB 700 as an anchor cell. For example, if a TP is changed from a source TP to a target TP which both correspond to the same anchor cell, the location information may not change. For example, the location information may be based on an identifier for the anchor cell (eNB 700 as a virtual anchor cell) to which the source TP and target TP correspond. Similarly, the location information may include a same E-UTRAN cell global identification (CGI) and/or a same tracking area identifier (TAI) as the anchor cell, eNB 700. Using the same location information may allow the eNB 700 or other TP to provide updated location information to the core network, (such as an MME within an EPC). Sending an update of UE location if the TP has been changed but the virtual cell has not been changed may not be required. However, in some embodiments it may still be necessary to update the UE location for charging purposes even if a TP corresponds to an anchor cell.

The TP change module 706 is configured to track a current TP for a UE. In one embodiment, the TP change module 706 receives a TP change request from a source TP indicating a handover to a target TP. In one embodiment, the TP change module 706 may determine, based on the TP change request, whether the target TP corresponds to the eNB 700. In one embodiment, if the target TP does not correspond to the eNB 700, the TP change module 706 may send an anchor change request to a macro cell that serves as an anchor cell for the target TP and send a TP change acknowledgement to the source TP. If the TP change module 706 determines that the target TP has the eNB 700 as an anchor cell, the TP change module may send a TP change acknowledgement to the source TP to allow the TP change.

The forwarding module 708 forwards communications for a UE between a current TP for the UE and the core network. In one embodiment, the forwarding module 708 forwards downlink communications to a source TP before a TP change and to a target TP after the TP change. In one embodiment, the forwarding module 708 is configured to forward control plane information and/or user plane information to the UE (via a current TP) over an X2 interface. In one embodiment, the eNB 700 receives downlink control plane information and/or user plane information via the same S1 bearer before and after the TP change.

Figure 8:
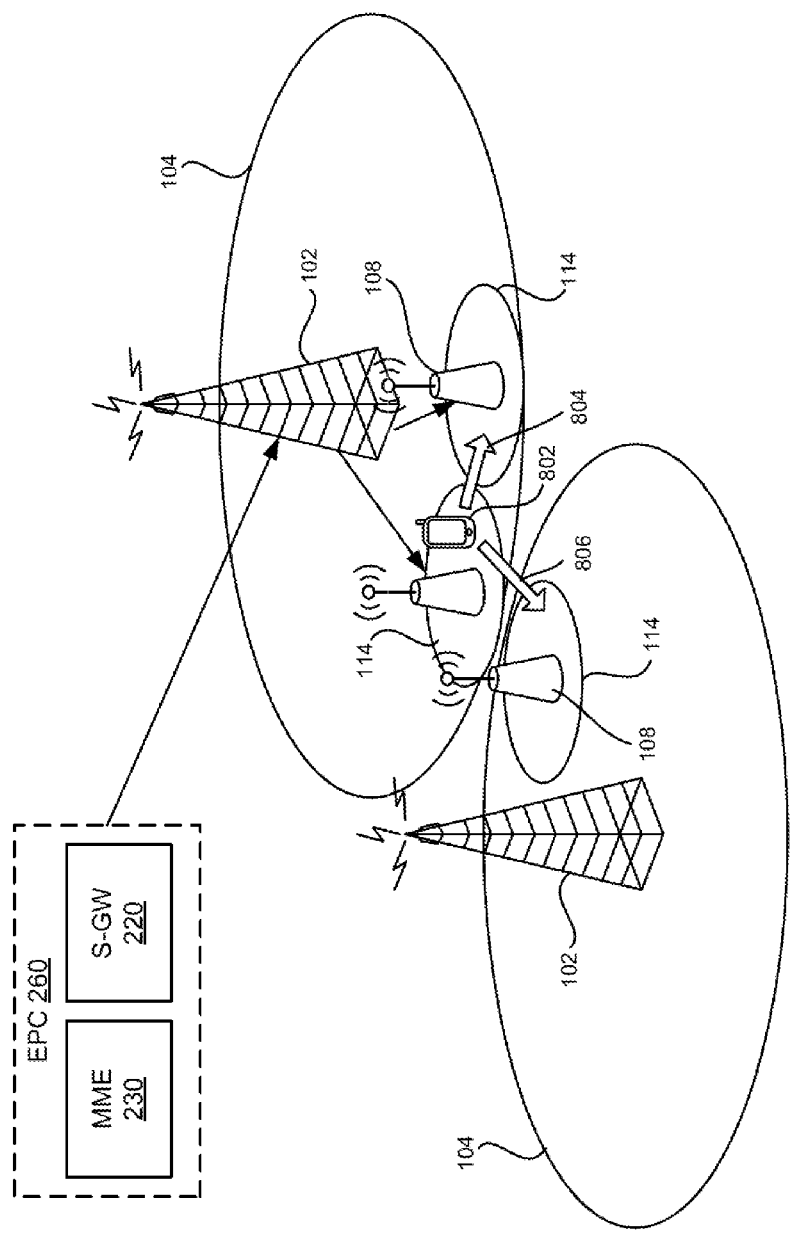
FIG. 8 illustrates a block diagram of a UE moving through a heterogeneous network in accordance with an example.
Figure 9:
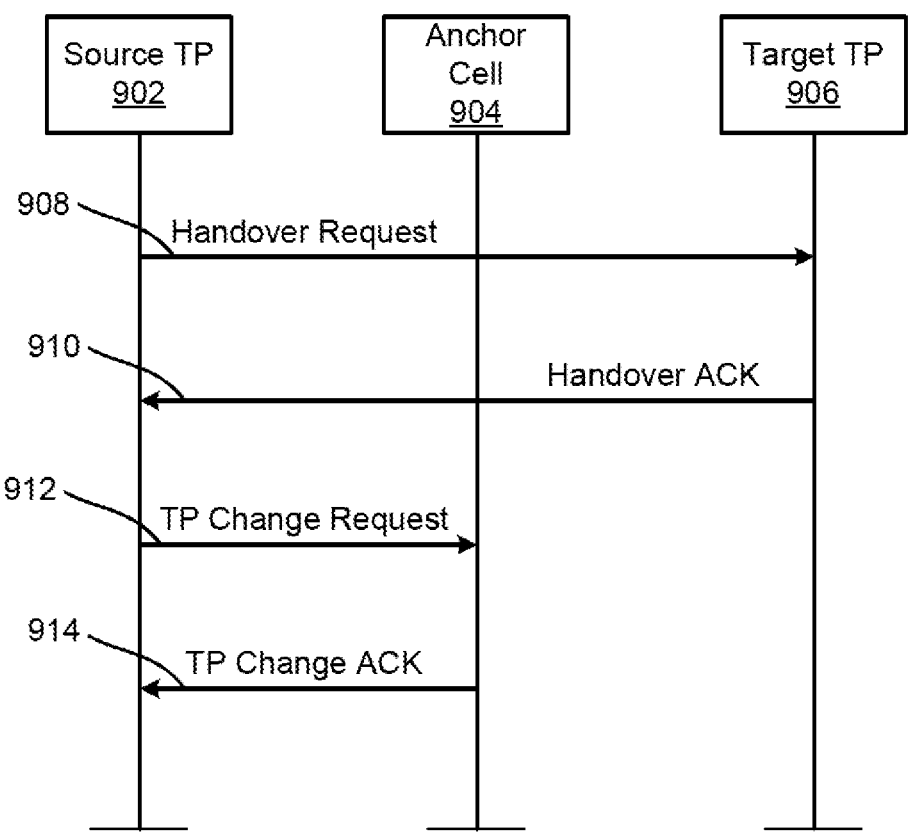
FIG. 9 illustrates a flow diagram of a change in transmission point between small cells corresponding to the same anchor cell in accordance with an example.
Figure 10:
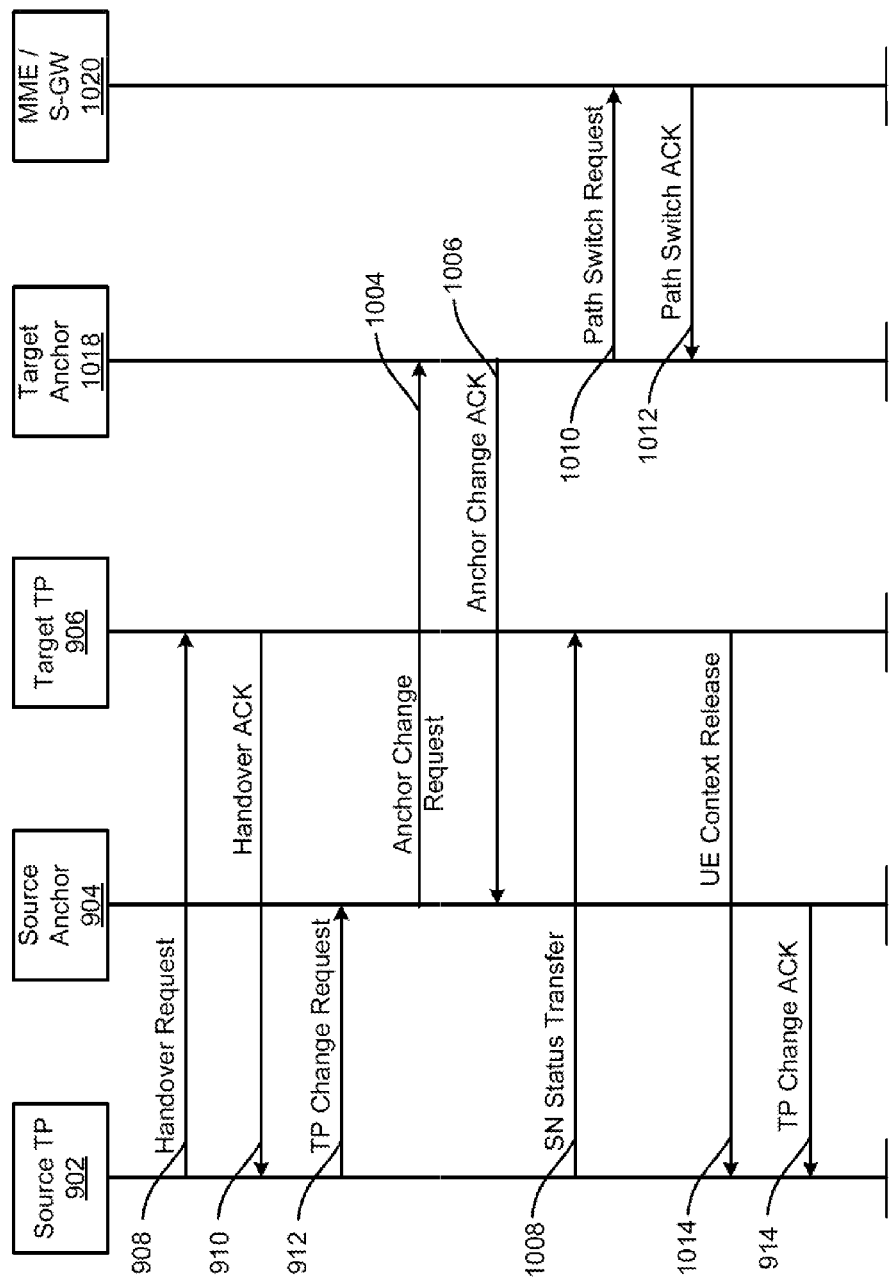
FIG. 10 illustrates a flow diagram of a change in transmission point between small cells corresponding to the different anchor cells in accordance with an example.

In addition to moving from an anchor serving cell to a small cell, the UE may move from one small cell to another small cell. For example, the UE may move from a source TP to a target TP that is in a same or different anchor cell. FIG. 8 illustrates a UE 802 that may move first direction 804 to a new TP within the same macro cell 104 or along a second direction 806 to a new TP within a different macro cell. The macro cells 104 may be operating as anchor cells for any corresponding small cells. For example, each macro cell 104 may be assigned to serve as an anchor cell for any small cells within their coverage area. Because the macro cells 104 may be operating as anchor cells and may store information corresponding to connected UEs, handover procedures may have reduced overhead and/or a different operation than conventional handover. FIGS. 9 and 10 illustrate example communication flow within a HetNet as the UE 802 moves along the first or second directions 804, 806 of FIG. 8.

FIG. 9 illustrates a communication flow within a HetNet as the UE 402 moves in the first direction 404 from a source TP to a target TP located in the same anchor cell (macro cell 104). According to one embodiment, a source TP 902 sends 908 a handover request to a target TP 906. The source TP 902 may send 908 the handover request in response to an instruction or message from an anchor cell 904 or UE or in response to measurement reports from the TIE. The source TP 902 receives 910 a handover acknowledgment (handover ACK) from the target TP 906 indicating that the handover will be accepted.

Upon receiving 910 the handover acknowledgment from the target TP 906, the source TP 902 notifies 912 the serving anchor cell 904 (macro eNB 104 associated with serving macro cell) that the TIE is moving to target TP 906. The source TP 902 may notify 912 the anchor cell 904 by sending a TP change request. In response to receiving the notification 912 of TP change, the anchor cell 904 may check if the target TP 906 belongs to its serving area. In the case of the first direction 404 of FIG. 4, the target TP 906 shares the same anchor cell (anchor cell 904) as the source TP 902. Based on the determination that the anchor cell 904 will be unchanged, the serving anchor cell 904 sends 914 a TP change acknowledgement back to the source TP 902. If an X2-based approach is used, there is no path switch required to establish an S1 bearer. In other words, the same S1 bearer that was used before the TP change may also be used after the TP change when traffic flows are forwarded over the anchor cell 904 to the target TP. Thus, signaling overhead with the core network can be reduced. In another embodiment, when an S1-based approach is used, then an associated path switch is required.

FIG. 10 illustrates a communication flow within a HetNet as the UE 402 moves in the second direction 406 from a source TP to a target TP located in a different anchor cell (macro cell 104). According to one embodiment, a source TP 902 sends 908 a handover request to a target TP 906. The source TP 902 may send 908 the handover request in response to an instruction or message from an anchor cell 904 or UE or in response to measurement reports from the UE. The source TP 902 receives 910 a handover acknowledgment (handover ACK) from the target TP 906 indicating that the handover will be accepted.

Upon receiving 910 the handover acknowledgment from the target TP 906, the source TP 902 notifies 912 the serving anchor cell 904 (macro eNB 104 associated with serving macro cell) that UE is moving to target TP 906. The source TP 902 may notify 912 the anchor cell 904 by sending 912 a TP change request. In one embodiment, the TP change request is sent in an RRC message. In response to receiving the notification 912 of TP change, the anchor cell 904 may check if the target TP 906 belongs to its serving area. In the case of the second direction 406 of FIG. 4, the target TP 906 does not share the same anchor cell (target anchor cell 1018) as the source TP 902 (source anchor cell 904). The target anchor 904 sends 1004 an anchor change request to the target anchor 1018 and receives 1006 an anchor change acknowledgement from the target anchor 1018. The source TP sends 1008 a sequence number (SN) status transfer to the target TP so that the target TP has the proper sequence number status.

Because the anchor will be changing, the target anchor 1018 sends 1010 a path switch request to the EPC (MME/S-GW 1020) to establish a new S1 bearer for the UE using the target anchor 1018. The target anchor 1018 receives 1012 a path switch acknowledgment allowing the path switch. The target TP 906 sends a UE context release 1014 and the source anchor 904 sends 1004 an anchor change acknowledgment. The traffic flows for the UE are now directed over the target anchor 1018 and/or the target TP 906. As illustrated above, a TP change to a small cell corresponding to the same anchor cell requires less signaling overhead than to a different anchor cell. More specifically, little or no signaling to a core network is required when the TP change is within the same anchor cell.

Figures 11A, 11B:
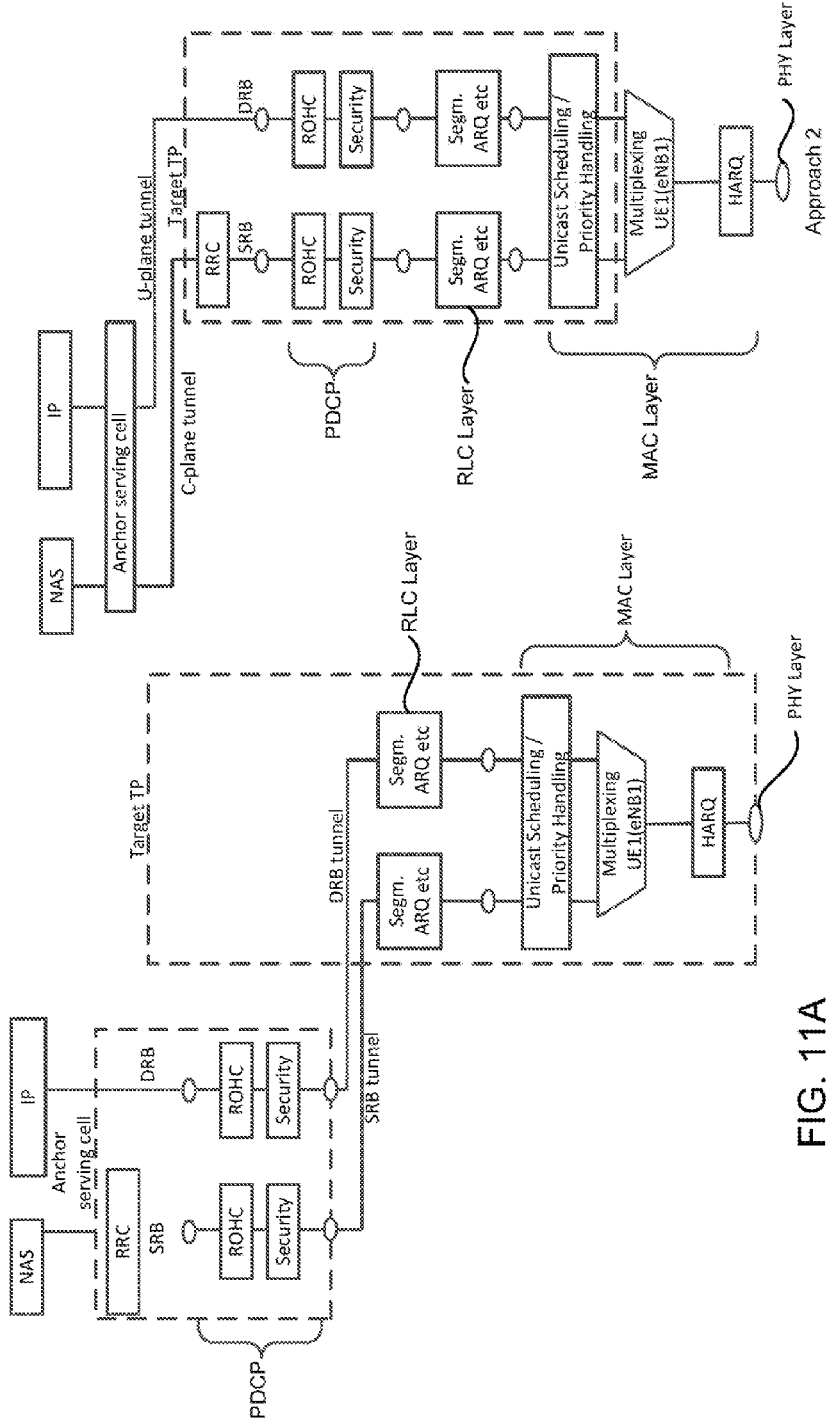
FIG. 11A illustrates a block diagram of a protocol architecture to provide a change in transmission point for a UE in accordance with an example.
FIG. 11B illustrates a block diagram of an additional protocol architecture to provide a change in transmission point for a UE in accordance with an example.

FIGS. 11A and 11B provide three examples of a protocol that may be used to enable a wireless system configured to communicate via the 3GPP UE specification to provide the TP change operation discussed in the preceding paragraphs. In one embodiment, the S1 path through the anchor serving cell may be maintained regardless of the TP change. This may allow for more frequent and flexible TP changes.

In a first example embodiment, illustrated in FIG. 11A, the anchor serving cell may be configured to host a packet data convergence protocol (PDCP) and an RRC layer. The control plane may include the RRC layer, which may provide communication from a non-access stratum (NAS), with the RRC communication carried by a signaling radio bearer (SRB). A user data plane may communicate TP packets via a data radio bearer (DRB) in the anchor serving cell. The data may be compressed using ROHC and have security applied, as illustrated in FIG. 11A. To forward a PDCP protocol data unit (PDU) between the Anchor eNB containing the source TP and the non-anchor eNB containing the target TP, a tunnel is established for each radio bearer. For example, an SRB tunnel and a DRB tunnel may be formed between the anchor serving cell and the target TP to carry the control data and user data, respectively, as PDCP PDUs in this example.

The target TP may include a radio link control (RLC) layer to receive the information via the SRB tunnel and DRB tunnel. A MAC and physical (PHY) layer may also be located in the target TP. Since security function is still in the anchor serving cell, it is not necessary to change a security key and maintain encryption.

Another embodiment is illustrated in FIG. 11B. In this example, all Access Stratum (AS) protocols are located in the non-anchor eNB containing the target TP. The S1 control and data paths are connected through the anchor eNB containing the source TP. To support it, a control plane (C-plane) tunnel and a user plane (U-plane) tunnel are established for each radio bearer. Since the security function is located in the target TP, the security key may need to be newly derived based on the target TP information as supported in handover. Alternatively, the anchor serving cell may pass the security key related parameters to the target TP so that the target TP may simply use the serving cell parameters to derive the security key.

In another embodiment, a different approach may be applied for DRB and for SRB. For instance, for DRB, approach 1 may be applied, while for SRB, approach 2 may be applied. Alternatively, the opposite configuration is also possible, with approach 1 applied for SRB and approach 2 applied for DRB.

In another example, when the UE camps on the small cell in the idle mode and thus, an RRC connection is established with the small cell in the connected mode for the actual call, three example approaches are provided that may be used to avoid a frequent handover. In a first approach, the small cell may be designated as the anchor serving cell if the UE performs an RRC connection establishment with the small cell. In this case, a TP change, as previously discussed, may be applied with the small cell operating as the anchor eNB.

In another approach, a macro cell that the small cell is overlaid on may always be designated as the anchor serving cell of the UE. When the UE performs an RRC connection establishment at a small cell, the small cell may configure the radio resource configuration and security key related parameters of the UE that correspond to those of the anchor macro cell. The small cell may request the macro cell to establish the connection to the MME/S-GW through the macro cell. When the macro cell establishes an S1 connection for this UE, the macro cell may provide the radio resource configuration and security key related parameters for this UE. The C-plane and U-plane tunnels may be established between the anchor macro cell and the small cell, as illustrated in FIG. 11B. Alternatively, the UE may avoid camping on the small cell during cell selection/reception.

In a third approach, after an RRC connection establishment, the small cell may be designated as the anchor serving cell of the UE. The small cell may be configured to perform a 'pseudo handover' of the UE to the macro cell. The macro cell then becomes the anchor serving cell. However, the small cell may remain as the source TP of the UE.

In another embodiment, a method 1200 for performing a handover in a heterogeneous wireless network (HetNet) is disclosed, as depicted in the flow chart of FIG. 12. The method includes the operation of receiving, at an anchor serving cell in the HetNet, channel measurement reports made by a user equipment (UE) for a plurality of cells, as shown in block 1210. The plurality of cells may include at least one macro cell and at least one low power node.

An additional operation of the method 1200 includes sending a transmission point (TP) change request that is based, in part, on the channel measurements for the UE, from the anchor serving cell to a target transmission point, wherein the target transmission point is located in one of the plurality of cells, as shown in block 1220. Information in addition to the channel measurements may also be used to identify a transmission point that will be communicated in the TP change request. A further operation comprises sending a TP change indicator from the anchor serving cell to the UE to indicate a change in TP with which the UE will communicate via an air interface, as shown in block 1230.

The method 1200 further comprises receiving uplink packets, from the UE, at the anchor serving cell via the target TP. The uplink packets may be sent from the UE to the target TP via the air interface and forwarded from the target TP to the anchor serving cell. The downlink packets may then be sent from the anchor serving cell to the target TP for transmission to the UE via the air interface.

The operation of receiving channel measurements may further comprise receiving the channel measurements made by the UE using channel state information reference signals (CSI-RS) to enable handover to occur for the UE from the anchor serving cell to the target TP while continuing to use a radio resource control (RRC) layer configured by the anchor serving cell.

The method 1200 may additionally include sending the TP change indicator from the anchor serving cell to the UE using one of downlink control information (DCI), radio resource control (RRC) signaling, and a medium access control (MAC) control element (CE); and receiving radio link monitoring information and uplink power control information at the anchor serving cell based on channel state information (CSI) reference signals (RS), information measured in an air interface between the UE and the TP target.

The method 1200 may also include sending at least one of a master information block (MIB) and a system information block (SIB) from the anchor serving cell to the UE via the target TP. For example, the MIB/SIB information may be sent from an anchor cell via an X2 connection to the target TP. If the RRC layer is located in the target TP, the UE may receive the target TP's MIB/SIB from the target TP directly.

In one embodiment, the UE may change from a source TP to a target TP by: receiving, at the anchor serving cell in the HetNet, channel measurement reports made by the user equipment (UE) for the plurality of cells; identifying that a change in TP is to be performed based on the channel measurement reports; and sending a TP change request from the anchor serving cell to a source TP that indicates the target TP to enable the source TP to forward the TP change request to the target TP.

The method 1200 may additionally include forming an uplink/downlink data path to the anchor serving cell by: forming an S1 data connection between the anchor serving cell and at least one of a mobile management entity (MME) and a serving gateway (S-GW); and forming an X2 interface between the anchor serving cell and the target TP to enable data communication between one of the MME and the S-GW with the UE via the target TP, wherein the target TP has a Uu connection with the UE.

The method 1200 also may include forming a U-plane tunnel between the anchor serving cell and the target TP to enable uplink data forwarding and downlink data forwarding between the anchor serving cell and the target TP. A c-plane tunnel may be formed between the anchor serving cell and the target TP to enable signaling radio bearer (SRB) communication for a downlink and an uplink between the anchor serving cell and the target cell.

FIG. 13 provides an example illustration of a mobile device, such as a user equipment (UE), a mobile station (MS), a mobile wireless device, a mobile communication device, a tablet, a handset, or other type of mobile wireless device. The mobile device may include one or more antennas configured to communicate with a node, macro node, low power node (LPN), or transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device may be configured to communicate using at least one wireless communication standard including 3GPP LTE, WiMAX, High Speed Packet Access (HSPA), Bluetooth, and WiFi. The mobile device may communicate using separate antennas for each wireless communication standard or shared antennas for multiple wireless communication standards. The mobile device may communicate in a wireless local area network (WLAN), a wireless personal area network (WPAN), and/or a WWAN.

FIG. 13 also provides an illustration of a microphone and one or more speakers that may be used for audio input and output from the mobile device. The display screen may be a liquid crystal display (LCD) screen, or other type of display screen such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a base station that includes an anchor module, a context information module, and a TP change module. The anchor module configures the base station as a virtual anchor cell in a 3GPP network for a plurality of small cells. The context information module is configured to maintain context information for UE. The context information for the UE is maintained by the context information module while any small cell of the plurality of small cells is configured as a TP for the UE. The TP change module is configured to send at least a portion of the context information to a small cell configured as the TP for the UE.

In Example 2, the TP change module of Example 1 can be optionally configured to send the at least the portion of the context information to the small cell in response to a TP change from a source TP to a target TP in the small cell.

In Example 3, the plurality of small cells of Examples 1-2 can be optionally at least partially located within or adjacent to a coverage area of the base station.

In Example 4, the UE of Examples 1-3 can optionally further include a forwarding module configured to forward communications for the UE to the UE via the source TP prior to the TP change and to forward communications for the UE to the UE via the target TP after the TP change.

In Example 5, the context information of Examples 1-4 can optionally include security information.

In Example 6, the security information of Example 5 can optionally include a same security key used by the base station as the anchor cell.

In Example 7, the security information of Example 5 can optionally include a different security key used by the base station as the anchor cell, and wherein the base station is configured to update security information with a network infrastructure module.

Example 8 is an eNB that configures the eNB to store context information for a UE when any a plurality of small cells are configured as a TP for the UE. The eNB is a macro cell. The eNB is configured to receive a TP change request from a source TP to handover the UE to a target TP. The plurality of small cells include the source TP and the target TP. The TP change is transparent to one or more of a mobility management entity (MME) and a serving gateway (S-GW).

In Example 9, the TP change of Example 8 can optionally be transparent to the MME and control plane information can optionally be directed to the UE through the eNB before and after the TP change.

In Example 10, the eNB of Examples 8-9 can optionally further include circuitry configured to forward control plane information for the UE to the target TP over an X2 interface.

In Example 11, the TP change of Examples 8-10 can optionally be transparent to the S-GW and user plane information can optionally be directed to the UE through the eNB before and after the TP change.

In Example 12, the eNB of Examples 8-11 can optionally further include circuitry configured to forward user plane information for the UE to the target TP over an X2 interface. The eNB can optionally receive the user plane information over the same S1 bearer before and after the TP change.

In Example 13, the eNB of Examples 8-12 can optionally further include circuitry configured to forward security information to the target TP. The security information can optionally include a same security key already stored by the MME corresponding to the UE.

In Example 14, the context information of Examples 8-13 can optionally include a same location information used for the source TP as for the target TP.

In Example 15, the same location information of Example 14 can optionally include an identifier of the virtual anchor cell.

In Example 16, the same location information of Examples 14-15 can optionally include a same E-UTRAN CGI.

In Example 17, the same location information of Examples 14-16 can optionally include a same TAI.

Example 18 is a handover method that includes sending, from a source TP in a 3GPP network, a handover request to a target TP to request a handover of UE from the source TP to the target TP. The method includes receiving, by the source TP, a handover acknowledgement from the target TP. The method includes sending a TP change request to a serving anchor cell. The serving anchor cell comprises a macro cell and the source TP and the target TP both comprise small cells.

In Example 19, the source TP and the target TP of Example 18 can optionally both correspond to the serving anchor cell.

Example 20 is a computer program product that includes a computer-readable storage medium storing program code for causing one or more processors to perform a method. The method includes sending a handover request to a target transmission point and receiving a handover acknowledgement. The method includes sending an anchor change request to an anchor macro cell. The target transmission point corresponds to a different anchor macro cell. The method includes receiving an anchor change acknowledgement indicating changing of the transmission point and the anchor.

In Example 21 the method of Example 20 can optionally further include sending a sequence number status transfer to the target transmission point.

In Example 22, the method of Examples 20-21 can optionally further include receiving a UE context release message from the target transmission point and deleting context information corresponding to the UE.

In Example 23, sending the anchor change request in Examples 20-22 can optionally include sending an RRC message comprising the anchor change request.

Example 24 is a method for UE mobility. The method includes configuring a base station as a virtual anchor cell in a 3GPP network for a plurality of small cells. The method includes maintaining context information for the UE. The context information for the UE is maintained while any small cell of the plurality of small cells is configured as a TP for the UE. The method includes sending at least a portion of the context information to a small cell configured as the TP for the UE.

In Example 25, the method of Example 24 can optionally include sending the at least the portion of the context information to the small cell in response to a TP change from a source TP to a target TP in the small cell.

In Example 26, the plurality of small cells of Examples 24-25 can be optionally at least partially located within or adjacent to a coverage area of the base station.

In Example 27, the method of Examples 24-26 can optionally further include forwarding communications for the UE to the UE via the source TP prior to the TP change and forwarding communications for the UE to the UE via the target TP after the TP change.

In Example 28, the context information of Examples 1-4 can optionally include security information.

In Example 29, the security information of Example 28 can optionally include a same security key used by the base station as the anchor cell.

In Example 30, the security information of Example 28 can optionally include a different security key used by the base station as the anchor cell, and wherein the base station is configured to update security information with a network infrastructure module.

Example 31 is a method for UE mobility that includes configuring an eNB to store context information for the UE when any of a plurality of small cells are configured as a TP for the UE. The eNB includes a macro cell. The method includes receiving a TP change request from a source TP to handover the UE to a target TP. The plurality of small cells include the source TP and the target TP. The TP change is transparent to one or more of a MME and a S-GW.

In Example 32, the TP change of Example 31 can optionally be transparent to the MME and the method can optionally further include directing control plane information to the UE through the eNB before and after the TP change.

In Example 33, the method of Examples 31-32 can optionally include forwarding control plane information for the UE to the target TP over an X2 interface.

In Example 34, the TP change of Examples 31-33 can optionally be transparent to the S-GW and the method can optionally further include directing user plane information to the UE through the eNB before and after the TP change.

In Example 35, the method of Examples 31-34 can optionally include forwarding user plane information for the UE to the target TP over an X2 interface. The method can also optionally further include receiving the user plane information over the same S1 bearer before and after the TP change.

In Example 36, method of Examples 31-35 can optionally further include forwarding security information to the target TP. The security information can optionally include a same security key already stored by the MME corresponding to the UE.

In Example 37, the context information of Examples 31-36 can optionally include a same location information used for the source TP as for the target TP.

In Example 38, the same location information of Example 37 can optionally include an identifier of the virtual anchor cell.

In Example 39, the same location information of Examples 37-38 can optionally include a same E-UTRAN CGI.

In Example 40, the same location information of Examples 37-39 can optionally include a same TAI.

Example 41 is a handover method that includes sending, from a source. TP in a 3GPP network, a handover request to a target. TP to request a handover of UE from the source TP to the target TP. The method includes receiving, by the source TP, a handover acknowledgement from the target TP. The method includes sending a TP change request to a serving anchor cell. The serving anchor cell includes a macro cell and the source TP and the target TP both include small cells.

In Example 42, the source TP and the target TP of Example 41 can optionally both correspond to the serving anchor cell.

Example 43 is a method for handover of a UE. The method includes sending a handover request to a target transmission point and receiving a handover acknowledgement. The method includes sending an anchor change request to an anchor macro cell. The target transmission point corresponds to a different anchor macro cell. The method includes receiving an anchor change acknowledgement indicating changing of the transmission point and the anchor.

In Example 44 the method of Example 43 can optionally further include sending a sequence number status transfer to the target transmission point.

In Example 45, the method of Examples 43-44 can optionally further include receiving a UE context release message from the target transmission point and deleting context information corresponding to the UE.

In Example 46, sending the anchor change request in Examples 43-45 can optionally include sending an RRC message comprising the anchor change request.

Example 47 is an apparatus that includes means to perform a method as claimed in any of Examples 24-47.

Example 48 is a machine readable storage including machine-readable instructions that, when executed, implement a method or realize an apparatus of any of Examples 24-48.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection With the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The invention claimed is:

1. A base station comprising:
storage for context information for a user equipment (UE) and a virtual cell identity for a set of small cells networked with the base station acting as transmission points (TPs) for the UE;
memory coupled with a processor configured to:
configure the base station as a virtual anchor cell with the virtual cell identity in a third generation partnership project (3GPP) network for a plurality of small cells, the virtual cell identity enabling the UE to change between the TPs networked with the base station without changing the UE context information at a mobility management entity (MME) or a serving gateway (S-GW) within a core network;
maintain the context information for the UE, wherein the context information for the UE is maintained by a context information module while any small cell of the plurality of small cells is configured as a TP for the UE; and
send at least a portion of the context information to a small cell configured as a target TP for the UE without causing a radio resource reconfiguration when a handover occurs based at least in part on the TP using the virtual cell identity, the UE remaining connected with the virtual cell identity while using the target TP after the handover.

2. The base station of claim 1, wherein the processor is configured to send the at least the portion of the context information to the small cell in response to a TP change from a source TP to a target TP in the small cell.

3. The base station of claim 1, wherein the plurality of small cells are at least partially located within or adjacent to a coverage area of the base station.

4. The base station of claim 1, wherein the processor is configured to forward communications for the UE to the UE via the source TP prior to the TP change and to forward communications for the UE to the UE via the target TP after the TP change.

5. The base station of claim 1, wherein the context information comprises security information.

6. The base station of claim 5, wherein the security information comprises a same security key used by the base station as the anchor cell.

7. The base station of claim 5, wherein the security information comprises a different security key used by the base station as the anchor cell, and wherein the processor is configured to update security information.

8. An Evolved Universal Terrestrial Radio Access Network (E-UTRAN) Node B (eNB) comprising circuitry configured to:
   configure the eNB to store context information for user equipment (UE) when any of a plurality of small cells networked with the eNB are configured as a transmission point (TP) for the UE using a virtual cell identity, wherein the eNB comprises a macro cell;
   receive a TP change request from a source TP to handover the UE to a target TP, wherein the plurality of small cells comprise the source TP and the target TP; and
   wherein the virtual cell identity enables the TP change to be transparent to one or more of a mobility management entity (MME) and a serving gateway (S-GW) by leaving the context information at the MME and S-GW unchanged and wherein the TP change is accomplished without causing a radio resource reconfiguration.

9. The eNB of claim 8, wherein the TP change is transparent to the MME and wherein control plane information is directed to the UE through the eNB before and after the TP change.

10. The eNB of claim 9, further comprising circuitry configured to forward control plane information for the UE to the target TP over an X2 interface.

11. The eNB of claim 8, wherein the TP change is transparent to the S-GW and wherein user plane information is directed to the UE through the eNB before and after the TP change.

12. The eNB of claim 11, further comprising circuitry configured to forward user plane information for the UE to the target TP over an X2 interface, wherein the eNB receives the user plane information over the same S1 bearer before and after the TP change.

13. The eNB of claim 8, wherein the context information comprises a same location information used for the source TP as for the target TP.

14. The eNB of claim 13, wherein the same location information comprises an identifier of a virtual anchor cell.

15. The eNB of claim 13, wherein the same location information comprises a same E-UTRAN cell global identification (CGI).

16. The eNB of claim 13, wherein the same location information comprises a same tracking area identifier (TAI).

17. A handover method comprising:
   sending, from a source transmission point (TP) in a third generation partnership project (3GPP) network, a handover request to a target TP to request a handover of user equipment (UE) from the source TP to the target TP;
   receive, by the source TP, a handover acknowledgement from the target TP; and
   send a TP change request to a serving anchor cell, wherein the serving anchor cell comprises a macro cell, and the source TP and the target TP both comprise small cells networked with the serving anchor cell;
   wherein the change request is implemented without causing a radio resource reconfiguration when the handover occurs based at least in part on the virtual cell identity shared by the source TP and the target TP, the virtual cell identity enabling the UE to change between the source TP and the target TP without changing the UE context information at a mobility management entity (MME) or a serving gateway (S-GW) within a core network.

18. The method of claim 17, wherein the source TP and the target TP both correspond to the serving anchor cell.

19. A computer program product comprising a non-transitory computer-readable storage medium storing program code for causing one or more processors to perform a method, the method comprising:
   sending a handover request to a target transmission point and receiving a handover acknowledgement;
   sending an anchor change request to an anchor macro cell, wherein the target transmission point corresponds to a different anchor macro cell; and
   receiving an anchor change acknowledgement indicating changing of the transmission point and the anchor,
   wherein the anchor macro cell uses a first virtual cell identity and the different anchor macro cell uses a second virtual cell identity, and
   wherein transmission points that share a virtual cell identity with the different anchor macro cell can perform a handover without causing a radio resource reconfiguration, the shared virtual cell identity enabling the UE to change between the transmission points networked with the different anchor macro cell without changing UE context information at a mobility management entity (MME) or a serving gateway (S-GW) within a core network.

20. The computer readable medium of claim 19, wherein the method further comprises receiving a UE context release message from the target transmission point and deleting context information corresponding to the UE.

21. A base station comprising:
   storage for context information for a user equipment (UE) and a virtual cell identity for a set of small cells networked with the base station and acting as transmission points (TPs) for the UE;
   memory coupled with a processor configured to:
      configure the base station as a virtual anchor cell with the virtual cell identity for the small cells and base station in a third generation partnership project (3GPP) network for a plurality of small cells, the virtual cell identity enabling the UE to change between the TPs networked with the base station transparently to a mobility management entity (MME) or a serving gateway (S-GW) within a core network, the change between the TPs networked with the base station performed without changing UE context information at the MME or the S-GW;
      maintain the context information for the UE, wherein the context information for the UE is maintained by a context information module while any small cell of the plurality of small cells is configured as a TP for the UE;
      send at least a portion of the context information to a target small cell configured as the TP for the UE without causing a radio resource reconfiguration when a handover occurs to the target small cell based at least in part on the virtual cell identity;
      receive UE uplink data from the TP for the UE using an X2 interface;

send the UE uplink data to a S-GW;
receive downlink data for the UE from the core network; and
send the downlink data for the UE to the TP for the UE using the X2 interface.

\* \* \* \* \*